United States Patent [19]

Buck et al.

[11] Patent Number: 5,056,223
[45] Date of Patent: Oct. 15, 1991

[54] HAND TOOL FOR DE-CORING CABBAGE HEADS

[76] Inventors: Helen Buck; Evelyn Sterling, 905 Sanderson Ave., both of Scranton, Pa. 18509

[21] Appl. No.: 478,689
[22] Filed: Feb. 12, 1990
[51] Int. Cl.⁵ .............................................. A47J 25/00
[52] U.S. Cl. ...................................... 30/113.1; 99/544
[58] Field of Search ................ 30/113.1, 113.2, 113.3, 30/114, 355; 99/542, 544, 547, 565

[56] References Cited

U.S. PATENT DOCUMENTS

| | | | |
|---|---|---|---|
| 496,734 | 5/1893 | Hall et al. | 99/565 |
| 1,293,351 | 2/1919 | Creasey | 30/113.1 |
| 1,530,822 | 3/1925 | Gibson | 99/544 |
| 1,704,366 | 3/1929 | Mehserle | 99/547 |
| 1,848,985 | 3/1932 | Yahn | 99/544 |
| 2,188,362 | 1/1940 | Krilow | 30/113.3 |
| 2,493,979 | 1/1950 | Kudd | 30/25 |
| 2,549,008 | 4/1951 | Rasaka | 30/302 |
| 2,557,191 | 6/1951 | King | 30/113.1 |
| 2,683,312 | 7/1954 | Dover | 30/113.1 |
| 4,596,073 | 6/1986 | Ewald | 30/113.1 |
| 4,690,047 | 9/1987 | Balzano | 99/542 |
| 4,905,375 | 3/1990 | Braswell | 30/113.1 |

FOREIGN PATENT DOCUMENTS

| | | | |
|---|---|---|---|
| 2500736 | 9/1982 | France | 99/544 |
| 0434599 | 10/1967 | Switzerland | 30/113 |

Primary Examiner—Allan N. Shoap
Assistant Examiner—John L. Beres
Attorney, Agent, or Firm—Terry M. Gernstein

[57] ABSTRACT

A hand tool includes a cutting portion that is attached to a handle by a connecting portion, and is shaped and sized to efficiently separate a core from the leaves of a cabbage head and which will efficiently remove such separated core from the leaves.

3 Claims, 2 Drawing Sheets

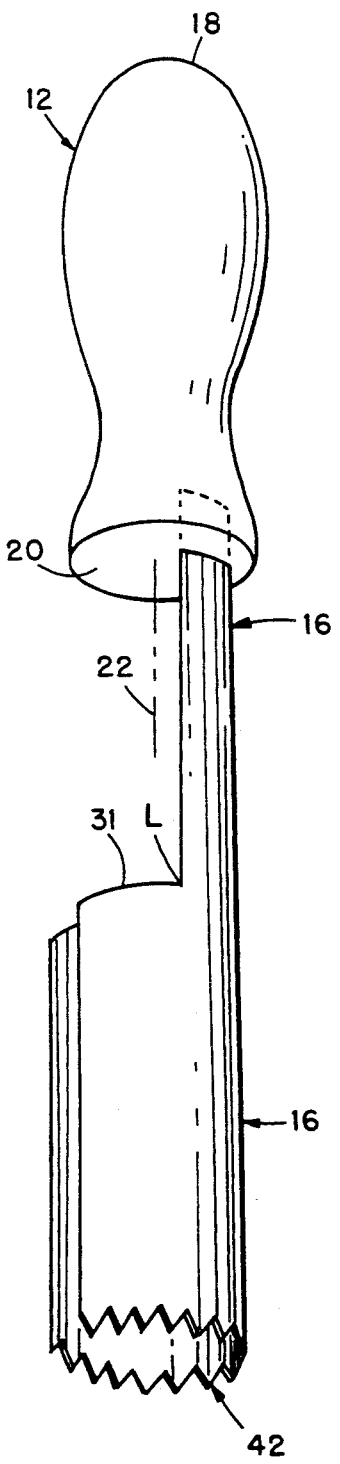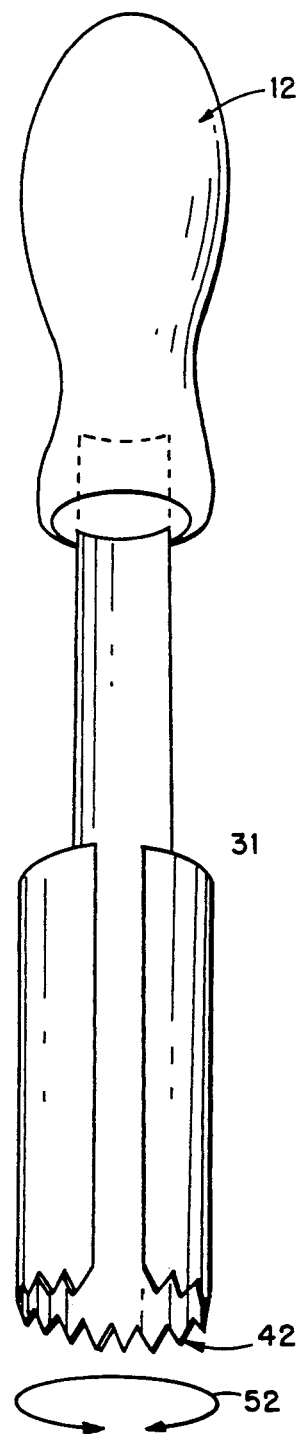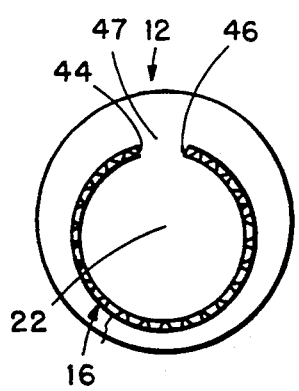

HAND TOOL FOR DE-CORING CABBAGE HEADS

TECHNICAL FIELD OF THE INVENTION

The present invention relates to the general art of hand tools, and to the particular field of hand tools used in the preparation of food.

BACKGROUND OF THE INVENTION

A cabbage is a biennial crucifer of the order Capparales that is grown for its head of edible leaves. It has been found that the cabbage is one of the most nutritious foods known, and therefore is much desired in many recipes.

However, as many cooks know, cabbage is one of the most frustrating foods to prepare. The core, in particular, is most frustrating to deal with since it must be removed in order to prepare the food.

Heretofore, many cooks simply rapped the cabbage head sharply against a solid object in a particular manner in order to loosen the core from the leaves. If this procedure is properly carried out, the core is loosened and can be removed from the leaves. However, a proper procedure may take several tries to achieve, and many cooks simply give up.

At the present time, the only way to remove the core from a cabbage head is to use a paring knife and cut around the core. Such a cutting process is time consuming.

While the art presently contains several different coring devices, such as apple corers and the like, such devices are not entirely applicable to coring cabbage. Coring a cabbage requires application of the proper force in a proper direction, especially in a restaurant or institutional situation where many cabbage heads may have to be de-cored.

Still further, once the core has been separated from the leaves, it must be removed from such leaves. Such removal often requires additional steps, which may waste further time.

Therefore, there is a need for a hand held device that is especially designed for the exigencies of coring a cabbage head, and which will apply force in the proper direction and with the least amount of effort, and will also facilitate easy removal of the core from the cabbage head.

OBJECTS OF THE INVENTION

It is a main object of the present invention is to provide a hand held device that is especially designed for the exigencies of coring a cabbage head.

It is another object of the present invention to provide a hand held device that is especially designed for the exigencies of coring a cabbage head and which will apply force in the proper direction.

It is another object of the present invention to provide a hand held device that is especially designed for the exigencies of coring a cabbage head and which will apply force in the proper direction and with the least amount of effort.

It is another object of the present invention to provide a hand held device that is especially designed for the exigencies of coring a cabbage head and which will apply force in the proper direction and with the least amount of effort, and will also facilitate easy removal of the core from the cabbage head.

SUMMARY OF THE INVENTION

These, and other, objects are achieved by a hand-held tool that is specifically designed to separate and remove a core from the leaves of a cabbage head. The tool has a handle that is easily held and which is attached to a shank that is configured and located on the handle to direct force from the handle in manner that is most effective for de-coring a cabbage. The device further includes a cutting portion that is designed and sized to transmit the force from the handle and the shank in a manner that is most effective in de-coring a cabbage, and which will hold onto the core after it has been separated from the leaves so it can be removed from the leaves. The cutting portion includes a slit or gap therein so the separated and removed core can be easily removed from the device.

In this manner, the device of the present invention permits easy and expeditious separation of a core from the leaves of a cabbage head, and further permits such separated core to be easily removed from the leaves and discarded or the like so the tool can be used again.

BRIEF DESCRIPTION OF THE DRAWING FIGURES

FIG. 2 is a side elevational view thereof.

FIG. 3 is a front elevational view thereof.

FIG. 4 is an end view thereof.

DETAILED DESCRIPTION OF THE PREFERRED EMBODIMENT OF THE INVENTION

Figure 1:
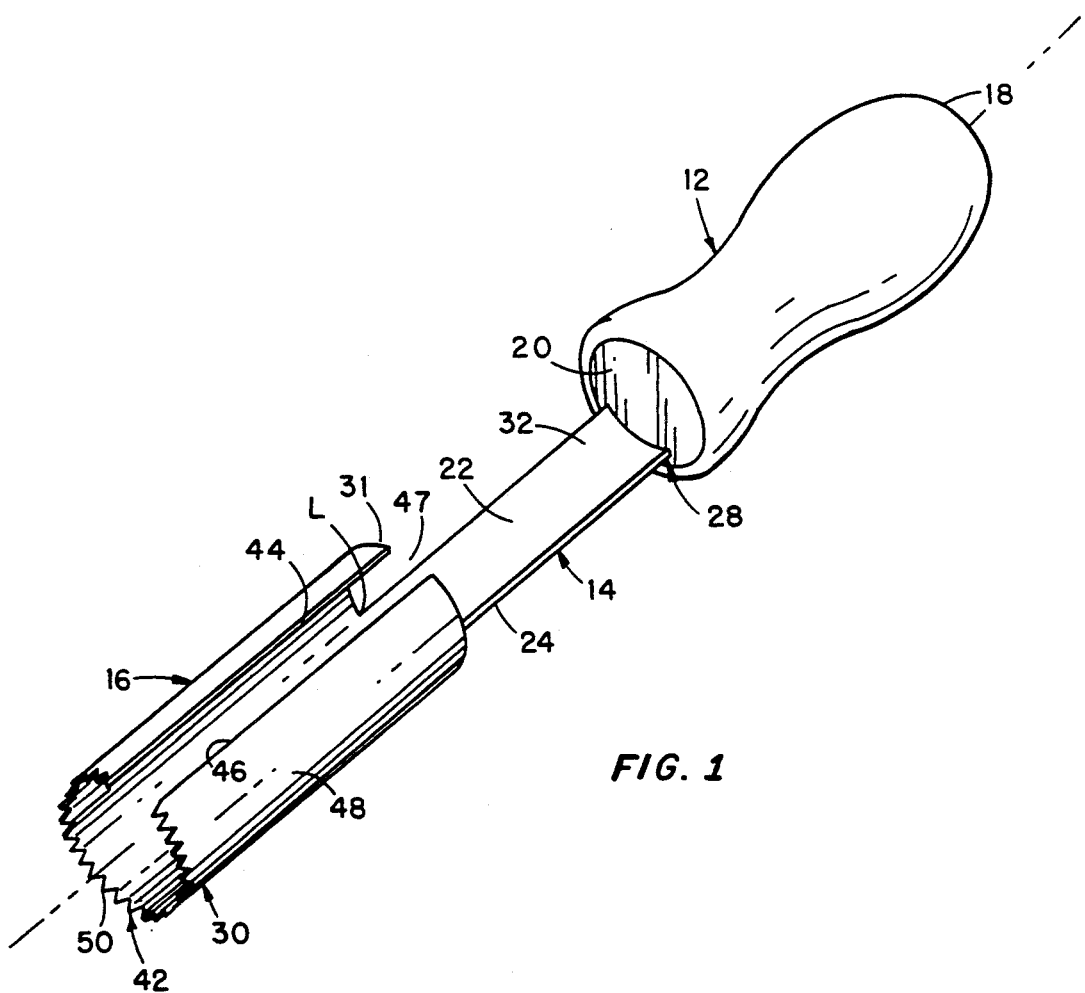
FIG. 1 is a front perspective view of a hand-held tool for de-cording a cabbage head embodying the present invention.

Shown in FIG. 1 is a hand-held tool 10 that is used to decore a cabbage head. The tool 10 is configured and designed to apply force to the core in an efficient manner and to then remove that core from the cabbage head in a manner that permits discarding the core in an expeditious manner.

The tool 10 thus includes a handle portion 12 and a shank portion 14 mounted on the handle portion. The shank portion includes a cutting portion 16 on the end thereof that is remote from the handle portion.

More specifically, the handle portion 12 has an arcuate butt end 18 and a planar end 20 that are connected by a sidewall 21 that is in the shape of an hourglass. The arcuate butt end is shaped to fit comfortably in the user's hand in abutting contact with the heel portion of that hand whereby force can be directed from the use's shoulders and upper arms with the user applying their weight to the coring device. As will be evident from the ensuing disclosure, the location and design of the shank and cutting portion of the tool are also selected to carry out this efficient application of force. This design permits a user who may not have much strength, such as an elderly person, or a person with handicapped hands, to efficiently apply enough force to the device to de-core a cabbage head.

As shown in FIG. 1, the planar end 20 is also circular in outer peripheral shape, and the handle has a longitudinal centerline 22 that extends between the planar end 20 and the butt end 18.

The shank portion 14 has an outer surface 24 that is arcuate in peripheral shape, and is affixed to the handle at a proximal end 28 of that shank. The shank extends outwardly from the handle planar end to a distal end 30 that is spaced from the proximal end 28 so the shank is elongate. The elongate shank curvature is selected to have a center of curvature located on a line that is aligned with the handle longitudinal centerline 22.

The shank has the proximal end thereof embedded in the handle and is divided into two sections, a connecting section 32 that extends from the planar handle end for a prescribed distance to an intermediate location L, and the cutting portion 16 that has a rear end 31 positioned at the intermediate location and which extends from the intermediate location L to the shank distal end 30. The connecting section has a length as measured from the handle front end to the intermediate location L, and the cutting portion has a length as measured from the rear end 31, which is located at such intermediate location, to the distal end 30, with the cutting portion length being essentially equal in longitudinal extent to the length of the connecting portion so that the cutting portion has enough mass to withstand the de-coring force and the shank has sufficient length to fit into even a large cabbage head without having the handle planar end abut the head thereby interfering with the de-coring operation.

The connecting section 32 is further defined by two parallel side edges 36 and 38 that are spaced apart from each other by an angular distance of less than ninety degrees so that the shank has sufficient strength to withstand de-coring forces yet does not contain too much material which must be cleaned and may make the device expensive to manufacture and sell.

The proximal end of the shank is affixed to the handle at a location that is spaced from the longitudinal centerline of the handle so that the application of de-coring force to the handle butt end 18 will be transferred along a line to the shank when the tool is held in position to de-core a cabbage head.

As shown in FIG. 1, the cutting portion is cylindrical in shape and has a center of curvature that is aligned with the handle longitudinal centerline 22. The cutting portion includes two parallel side edges 44 and 46 that are spaced apart by an angular distance with respect to the center of curvature of more than two hundred and seventy degress, but less than three hundred and sixty degrees so that a gap 47 is defined therebetween.

The cutting portion has an outer radius that is slightly smaller than the outer radius of the handle planar end, as is best seen in FIG. 4. The connecting section 32 is flush with the outer surface 48 of the cutting portion, and forms a continuation of the cutting portion as is best seen in FIG. 2. Thus, the pressing force applied to the handle butt end is transferred to the cutting edge 42 in an efficient manner with little or no wasted effort.

The cutting portion end 42 is serrated to have multiple cutting teeth, such as cutting tooth 50. The teeth are used to saw into the cabbage head, and the cutting portion is sized to have a radius larger than the radius of even a large cabbage head core. In this manner, the teeth 50 are used to saw into the cabbage head around the core of that head thus separating the core from the leaves. The rotating motion of the device is about the longitudinal centerline 22 and is indicated by double-headed arrow 52 in FIG. 3.

The tool 10 can be formed of any suitable materials, such as wood for the handle, and steel for the shank and cutting portion. However, other materials can be used without departing from the scope of the present invention.

Operation of the device will be evident to those skilled in the art based on the above-presented disclosure. Therefore, such operation will not be described beyond noting that the device is inserted into the cabbage head with the cutting portion positioned about the core by rotating and counter-rotating the device so the teeth 50 will saw into the cabbage head between the core and the leaves. Once the device is inserted all the way through the cabbage head and the core is separated from the leaves, the device is removed from the core. The sawing motion of the device will slightly separate the cutting portion sides 44 and 46 thereby permitting the natural resiliency of the cutting portion to cause that cutting portion to grasp the core. The tool is then removed, and the grasped core will be pulled away from the leaves. The removed core can then be easily pulled out of the cutting portion to be discarded.

It is understood that while certain forms of the present invention have been illustrated and described herein, it is not to be limited to the specific forms or arrangements of parts described and shown.

We claim:

1. A hand-held tool for de-coring a cabbage head comprising:
   A) a handle including
      (1) an arcuate butt end,
      (2) a planar front end which has a circular outer periphery,
      (3) an hour-glass shaped sidewall connecting said butt end to said front end, and
      (4) a longitudinal centerline extending from said front end to said butt end;
   B) a shank which includes
      (1) a proximal end embedded in said handle through said handle front end,
      (2) a connecting section extending from said proximal end to an intermediate location and having a length as measured between said handle front end to said intermediate location,
      (3) a cutting portion extending from said connecting section intermediate location to a distal end and having a length measured from said intermediate location to said distal end that is essentially equal to the length of said connecting section,
      (4) a multiplicity of cutting teeth on said cutting portion distal end,
      (5) said connecting section having an arcuate outer periphery and having a center of curvature which is positioned in line with said handle longitudinal centerline, said connecting section having a radius of curvature as measured from said connecting section center of curvature to said connecting section outer periphery and having a peripheral angular extent of less than ninety degrees with respect to said center of curvature, said connecting section being spaced from said handle longitudinal centerline and from said handle front end outer periphery,
      (6) said cutting portion having an arcuate outer periphery and having a center of curvature which is positioned in line with said handle longitudinal centerline, said cutting portion having a radius of curvature as measured from said cutting portion center of curvature to said cutting portion outer periphery and having a peripheral angular extent of more than two hundred and seventy degrees and less than three hundred and sixty degrees with respect to said center of curvature to define a gap in said cutting portion outer periphery, said cutting portion outer periphery being flush with said connecting portion outer periphery and having a radius of curvature that is the same as the radius of curvature of said connecting section.

2. The hand tool defined in claim 1 wherein said handle circular front end has a radius and said cutting portion radius of curvature is less than said handle front end outer periphery radius.

3. The hand tool defined in claim 2 wherein said cutting portion cutting teeth are arranged in a serrated pattern.

* * * * *